Oct. 24, 1950     W. F. SCHMELING     2,527,456
TENSION MEASURING MEANS FOR TONG ARMS
Filed March 18, 1949     2 Sheets-Sheet 1

INVENTOR.
William F. Schmeling
BY Owen & Owen,
ATTORNEYS

Oct. 24, 1950 W. F. SCHMELING 2,527,456
TENSION MEASURING MEANS FOR TONG ARMS
Filed March 18, 1949 2 Sheets-Sheet 2

INVENTOR.
William F. Schmeling
BY Owen & Owen,
ATTORNEY

Patented Oct. 24, 1950

2,527,456

UNITED STATES PATENT OFFICE 2,527,456

TENSION MEASURING MEANS FOR TONG ARMS

William F. Schmeling, Fort Worth, Tex.

Application March 18, 1949, Serial No. 82,200

3 Claims. (Cl. 73—139)

This invention relates to tension or torque measuring devices, and more particularly to such a device adapted to measure the turning stress applied to an object such, for instance, as a pipe during a joint tightening or loosening operation.

In the drilling of oil wells, or the like, the drill pipe sections are successively coupled together with a sufficient turning force to prevent a leaky joint and at the same time not enough to injure the thread or otherwise damage the pipes or tool joints. In order to have a leak-resisting connection and one which has the customary physical requirements, such as proper tension, torsion and compressive strength, it is necessary that the interference between the mating members be within the range of tolerances specified by the manufacturer of the product. If the interference is less than required, the connection may leak and its resistance to tension, torsion and compressive strength will be impaired. If the interference is greater than required, the threads of the mating members may be galled and destroyed to such an extent as to cause complete failure, which may result in the loss of the well.

The primary object of the invention is the provision of a simple and efficient attachment for use in connection with the pipe turning equipment commonly used in well drilling operations and that is interposed between the cathead or the power applying line and the tong arm of such equipment to indicate the resistance of the pipe to torsional movement due to the thread engagement in the coupling, so that a tightening of the couplings will be sufficient to render them leak-proof but not great enough to destroy or do damage to the threads.

Further objects and advantages of the invention will be apparent from the following detailed description, and from the accompanying drawings, in which—

Figure 1:
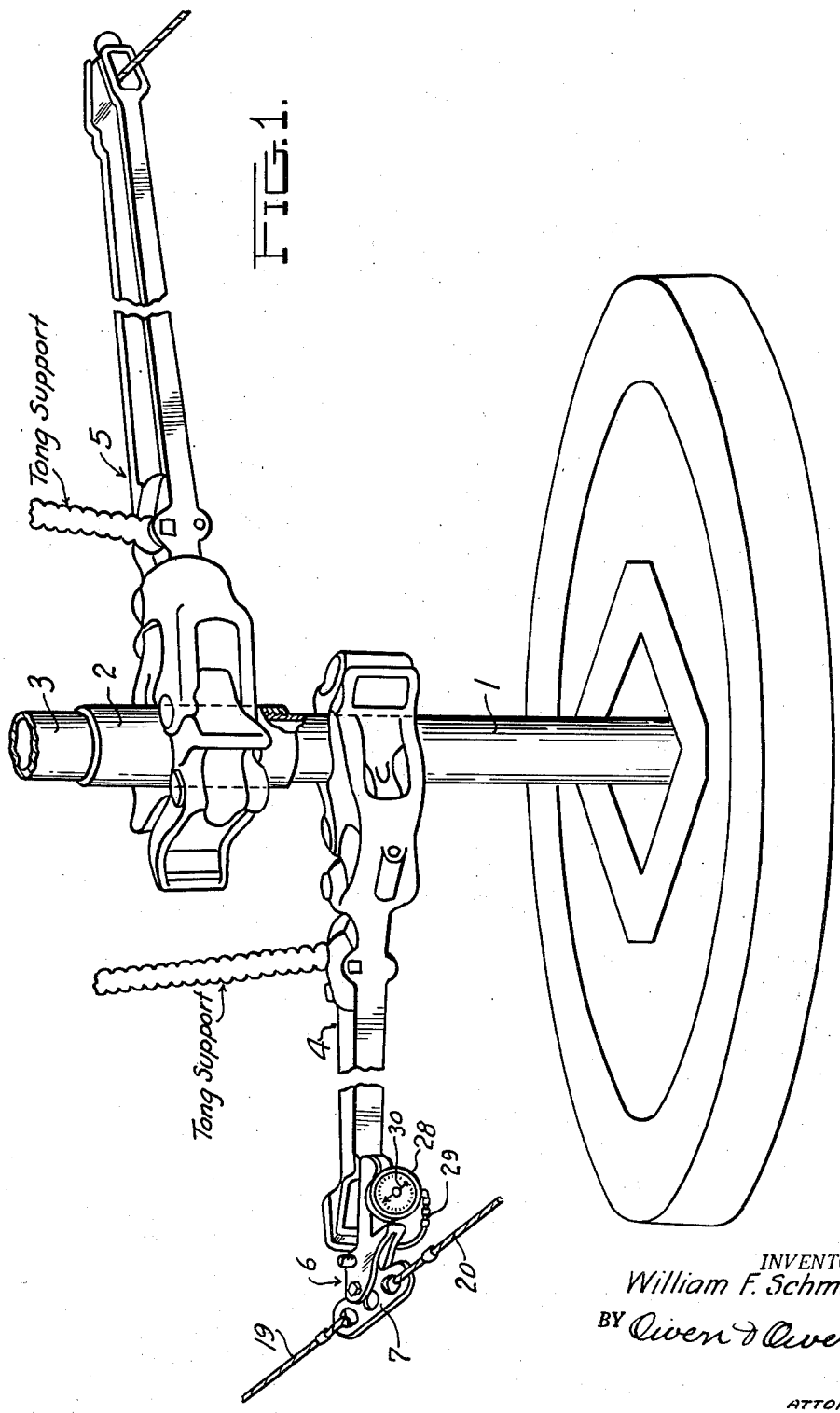
Figure 2:
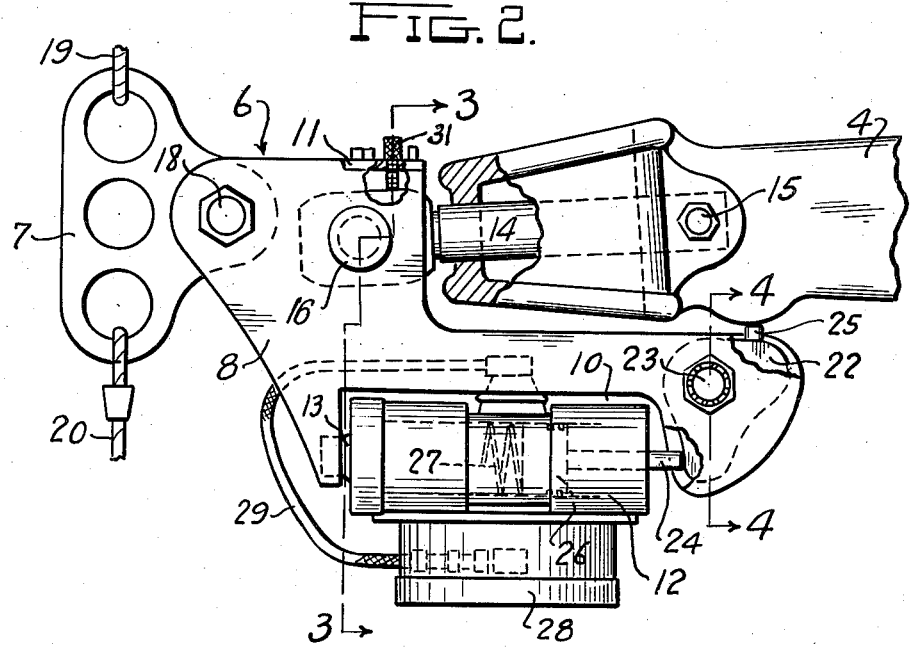
Figure 3:
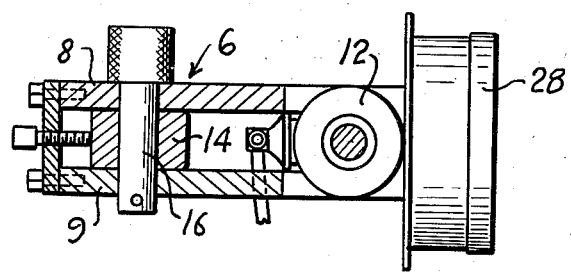
Figure 4:
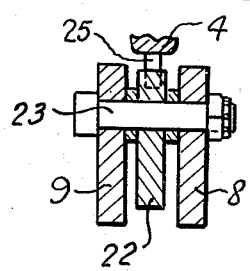

Fig. 1 is a perspective view of the top portion of a well with two sections of pipe and their coupling joint projecting therefrom and with the power and holding tong arms operatively connected therewith, with the feature embodying the present invention associated with the holding tong arm; Fig. 2 is an enlarged top plan view of the outer end portion of the holding tong arm, with the measuring device attached thereto and with parts broken away; Fig. 3 is a section on the line 3—3 in Fig. 2, and Fig. 4 is a section on the line 4—4 in Fig. 2.

Referring to the drawings, 1 designates a pipe or drill stem partially lowered into a well and 2 a coupling for attaching a succeeding pipe or section 3 thereto by threading action. In practice, in coupling two pipe sections together, a holding tong 4 is clutched to the pipe 1 to prevent it from turning, and a power or securing tong 5 is clutched to the coupling and operates to apply a turning force to the coupling in a direction to tighten it on the pipe.

The tension measuring device embodying the invention is indicated at 6 and is attached to the outer end of the tong arm 4 intermediate the customary line saddle 7 and the arm. In making this attachment, the usual tong-pin that connects the tong arm to the line saddle is removed and the device with its own tong-pin substituted therefor.

The device 6 includes a body frame formed, in the present instance, by upper and lower plates 8 and 9 suitably secured together in spaced relation and forming a generally L-shaped frame with the side arm thereof shaped at its outer side to form a recess 10 therein. A plate 11 rigidly connects the edges of the frame plates at their outer free ends and a hydraulic cylinder 12 is positioned within the recess 10 lengthwise thereof and mounted at its inner side between the plate edges and at 13 to one of the end walls of the recess. The cylinder attachments serve to rigidly connect the frame plates together at the edge portion thereof in which the recess 10 is provided.

The tong-pin 14, which is substituted for the usual tong-pin of the arm 4, is projected longitudinally into the pin-receiving opening in the outer end of the tong arm and secured therein by the usual pin-holding bolt 15. The outer end of the pin has an elongated head that is flattened to fit freely within the space between the frame plates in the base arm portion thereof so that the side arm of the frame extends inwardly for a distance along the side of the connecting tong arm. A pin 16 pivotally connects the tong-pin 14 to the frame plates.

The line saddle 7 is pivotally mounted between the frame plates at the outer side of the base arm thereof on a pivot bolt 18, with such bolt preferably offset slightly outward laterally of the axial line of the tong-pin 14. The line saddle has the usual weight line 19 attached to and extending forwardly therefrom transverse to the axial line of the tong-pin 14 and also has the usual cathead line 20 attached to and extending in the opposite direction therefrom. It is thus apparent that the line 20 in the present instance, acts as an anchor line for the holding tong arm 4 to resist a turning of such arm by the pipe screwing action of the tong arm 5.

A pressure foot 22 of bell crank lever form is mounted on a pin 23 between the plates 8 and 9 at the free end of a side arm portion of the frame 6 and has one arm bearing inwardly against the outer end of a piston rod 24 projecting from the adjacent end of the cylinder 12. The other arm of the member 22 has a stud 25 projecting laterally therefrom and in end-thrust contact with the adjacent side portion of the tong arm 4 a distance inward from its free or outer end. It is thus apparent that a movement of the frame 6 about the pivot 16 in a counterclockwise direction relative to the tong arm 4 will cause movement of the pressure foot 22 about the pivot 23 by reason of the engagement of pin 25 with the body of the tong arm 4. This movement of the pressure foot tends to force the piston rod 24 inward. It is further apparent that this action is caused by a pipe actuated turning movement of said tong arm.

The rod 24 projects from a piston 26 in the cylinder 12 and the piston is acted on within the cylinder by a coiled expansion spring 27 to normally cause projection of the rod. The interior of the cylinder on the spring side of the piston is in connection with a pressure gauge 28 through a tube 29, so that fluid pressure produced in the gauge by inward movement of the piston will move the indicator hand 30 around the graduated face of the gauge dial to indicate the turning force applied to the tong arm.

A set-screw 31 is threaded through the plate 11 in engagement at its inner end with a side of the tong-pin 14 slightly to the rear of the axis of the pin 16 to normally hold the stud 25 in engagement with the tong arm and to prevent lost motion therebetween when no turning pressure is exerted on the body frame 6 by the cathead line 20.

In operation, the tong arm 4 is placed in clutch engagement with pipe 1 and the weight line 19 exerts a clockwise pressure on the frame 6 and holds the adjusting screw 31 against the tong-pin 14 with the screw adjusted to take up any play between the pressure foot or lever 22 and the body of the tong arm 4. The cathead line 20 is attached taut to the customary cathead (not shown) with the gauge indicating no pressure, or a predetermined pressure, as may be desired. A turning force applied to the coupling 2 by the power tong arm 5 in tightening the screw connection between the coupling and pipe section 1 will be communicated in the same direction to the holding tong arm 4, thus tending to swing the arm 4 in clockwise direction against the restraining tension applied to the attachment 6 by the cathead line 20. This restraining tension causes a rocking of the attachment in counterclockwise direction on its pivot-pin 16 to move the set-screw 31 away from the tong-pin 14 and to move the pressure lever or foot pivot 23 toward the arm 4. This causes the lever 22 to move in a direction to force the cylinder plunger 26 inward and communicate an indicating pressure to the gauge hand 30. The operator can thus accurately determine the turning force applied in tightening the pipe connections and discontinue the tightening action when a desired torque has been reached.

While the means comprising the invention has been shown as attached to the outer end of the holding tong arm between it and the cathead line, it is apparent that it may, instead, be attached to the power tong arm 5, if desired, so that the power applying line instead of being attached directly to the tong arm will be attached to the outer end of the body frame 6. This attachment to the body frame may be either directly to the pin 18 or to such pin through the saddle 7.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. The combination with a pipe-engaging tong arm, of a stud member projecting lengthwise from its outer end, an L-shaped frame pivoted at its base portion to said member with its pivotal axis parallel to the arm swinging axis, a line saddle pivoted to said frame at the outer side of the frame pivot with its pivotal axes parallel to the axis of the frame, a pressure lever fulcrumed to the side portion of said frame whereby one arm contacts a side of the tong arm to apply pressure to the lever by the arm when the frame is swung toward the arm, and gauge means operated by arm pressure applied to the lever to indicate the amount of such pressure and thus the force applied to said arm.

2. An arrangement as called for in claim 1 wherein the saddle pivot is laterally offset outwardly from a line extending lengthwise of the arm and intersecting the frame pivot.

3. The combination with a pipe-engaging tong arm having a tong-pin projecting longitudinally from its outer end, of a lever-like member pivoted to said pin for swinging movements relative to the arm about an axis parallel to the swinging axis of the arm, said lever member having an arm extending outwardly from the attached tong arm lengthwise thereof and an arm extending inwardly at the side of the tong arm, and pressure gauge means carried by said member and operable by pressure of the member against the tong arm side to indicate force applied to the arm when a predetermined pivotal movement is applied to one of said members and arms relative to the other.

WILLIAM F. SCHMELING.

REFERENCES CITED

The following references are of record in the file of this patent:

UNITED STATES PATENTS

| Number | Name | Date |
|---|---|---|
| 2,122,760 | Scott et al. | July 5, 1938 |
| 2,191,725 | Pepperdine | Feb. 27, 1940 |
| 2,281,226 | Boles | Apr. 28, 1942 |

FOREIGN PATENTS

| Number | Country | Date |
|---|---|---|
| 709,212 | Germany | Aug. 9, 1941 |